United States Patent
Suehiro et al.

(10) Patent No.: US 8,290,276 B2
(45) Date of Patent: Oct. 16, 2012

(54) IMAGE DISPLAY DEVICE, IMAGE DISPLAY METHOD AND STORAGE MEDIUM STORING IMAGE DISPLAY PROGRAM

(75) Inventors: Masako Suehiro, Tokyo (JP);
Masakazu Nishijima, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 1076 days.

(21) Appl. No.: 12/205,494

(22) Filed: Sep. 5, 2008

(65) Prior Publication Data

US 2009/0087097 A1   Apr. 2, 2009

(30) Foreign Application Priority Data

Sep. 27, 2007  (JP) .................. 2007-251632

(51) Int. Cl.
*G06K 9/46* (2006.01)
*G06K 9/00* (2006.01)

(52) U.S. Cl. ..................... 382/190; 382/118

(58) Field of Classification Search .............. None
See application file for complete search history.

(56) References Cited

U.S. PATENT DOCUMENTS

| | | | | |
|---|---|---|---|---|
| 6,044,168 A * | 3/2000 | Tuceryan et al. | ........ | 382/118 |
| 6,064,752 A * | 5/2000 | Rozmus et al. | ........ | 382/117 |
| 6,088,040 A * | 7/2000 | Oda et al. | ........ | 345/473 |
| 6,094,498 A * | 7/2000 | Okumura | ........ | 382/118 |
| 6,134,339 A * | 10/2000 | Luo | ........ | 382/115 |
| 6,333,988 B1 * | 12/2001 | Seal et al. | ........ | 382/117 |
| 6,389,155 B2 * | 5/2002 | Funayama et al. | ........ | 382/118 |
| 6,631,208 B1 * | 10/2003 | Kinjo et al. | ........ | 382/167 |
| 6,714,665 B1 * | 3/2004 | Hanna et al. | ........ | 382/117 |
| 6,853,854 B1 * | 2/2005 | Proniewicz et al. | ........ | 600/319 |
| 6,885,766 B2 * | 4/2005 | Held et al. | ........ | 382/167 |
| 6,920,237 B2 * | 7/2005 | Chen et al. | ........ | 382/117 |
| 7,072,526 B2 * | 7/2006 | Sakuramoto | ........ | 382/282 |
| 7,092,554 B2 * | 8/2006 | Chen et al. | ........ | 382/118 |
| 7,127,108 B2 * | 10/2006 | Kinjo et al. | ........ | 382/203 |
| 7,130,453 B2 * | 10/2006 | Kondo et al. | ........ | 382/117 |
| 7,197,165 B2 * | 3/2007 | Ryan | ........ | 382/103 |
| 7,209,574 B2 * | 4/2007 | Tafuku et al. | ........ | 382/103 |
| 7,577,310 B2 * | 8/2009 | Kinjo | ........ | 382/274 |
| 7,660,482 B2 * | 2/2010 | Huang et al. | ........ | 382/275 |
| 7,804,982 B2 * | 9/2010 | Howard et al. | ........ | 382/115 |
| 8,098,902 B2 * | 1/2012 | Thorne | ........ | 382/118 |
| 8,131,013 B2 * | 3/2012 | Ikeda et al. | ........ | 382/103 |
| 2004/0213437 A1 * | 10/2004 | Howard et al. | ........ | 382/115 |
| 2005/0117802 A1 * | 6/2005 | Yonaha et al. | ........ | 382/173 |
| 2007/0183662 A1 * | 8/2007 | Wang et al. | ........ | 382/173 |
| 2007/0292001 A1 * | 12/2007 | Baba et al. | ........ | 382/118 |
| 2008/0304749 A1 | 12/2008 | Ogawa | | |

FOREIGN PATENT DOCUMENTS

JP  8-138024 A  5/1996

(Continued)

*Primary Examiner* — Manav Seth

(74) *Attorney, Agent, or Firm* — Birch, Stewart, Kolasch & Birch, LLP

(57) ABSTRACT

An image display device that includes an extraction component, a calculation component, an image processing component and a display component is provided. The extraction component extracts from photographic images a photographic image in which a face has been photographed. The calculation component calculates a position of an eye in the photographic image extracted by the extraction component. The image processing component performs image processing on the photographic image such that the position of the eye calculated by the calculation component will be at a predetermined position. The display component displays the photographic image which has been processed by the image processing component.

27 Claims, 10 Drawing Sheets

FOREIGN PATENT DOCUMENTS

| | | |
|---|---|---|
| JP | 2000-156775 A | 6/2000 |
| JP | 2000-292852 A | 10/2000 |
| JP | 2005-244571 A | 9/2005 |
| JP | 2006-293782 A | 10/2006 |
| JP | 2007-174589 A | 7/2007 |
| JP | 2008-305342 A | 12/2008 |

* cited by examiner

IMAGE DISPLAY DEVICE, IMAGE DISPLAY METHOD AND STORAGE MEDIUM STORING IMAGE DISPLAY PROGRAM

CROSS-REFERENCE TO RELATED APPLICATION

This application claims priority under 35 USC 119 from Japanese Patent Application No. 2007-251632, the disclosure of which is incorporated by reference herein.

BACKGROUND OF THE INVENTION

1. Field of the Invention

The present invention relates to an image display device, an image display method and a storage medium storing an image display program, and more particularly relates to an image display device that displays photographic images which have been photographed by a photography device such as a digital camera or the like.

2. Description of the Related Art

Often in photography with a photography device such as a digital camera or the like, a person who is a subject can be photographed many times. Then, at a time of replaying, in order to see an enlarged view of the face of the person who was the subject in photographic images obtained by photography with the photography device, it is necessary to perform complex controls, displaying a whole image and zooming in on a face position before viewing. When a number of images are being browsed, it is necessary to carry out this complex control repeatedly.

Accordingly, adjusting photographic images for display has been considered. As technologies relating to detecting faces of people appearing in photographic images when the images are to be adjusted and suchlike, technologies have been proposed in, for example, the descriptions of Japanese Patent Application Laid-Open (JP-A) Nos. 8-138024, 2000-292852 and 2006-293782.

With the technology described in JP-A No. 8-138024, it has been proposed to determine the orientation of an image on the basis of positional relationships of structural components of the human body. It has further been proposed to determine the orientation of an image from the positional relationship of a pair of eyes, which is a positional relationship of structural components of the body.

With the technology described in JP-A No. 2000-292852, for a face image photography device which photographs face images of subject persons, it has been proposed to measure a lateral width of a face in an inputted face image, and find a ratio of the measured face lateral width measurement value to a target face lateral width value, which is a suitable lateral width of a face. This ratio is specified as a zoom ratio, and face images of consistent sizes are obtained by performing zooming processing on inputted face images in accordance with the specified zoom ratios.

With the technology described in JP-A No. 2006-293782, it has been proposed to perform detection of a position of a face region or pair of eyes or the like of a person appearing in such an image, by face recognition technology, and also to calculate an inclination angle of the face region. A partial region of the image, such as the detected face region or the like, is cropped, and the partial region of the image is magnified/reduced and outputted. It is also proposed to perform rotation processing of the face image in accordance with the inclination angle of the face region.

However, with the technologies described in JP-A Nos. 8-138024 and 2000-292852 and the like, keeping positions of faces displayed in images constant is not given serious consideration, so the line of sight of a user browsing through images will move for each image, and there is room for improvement.

Furthermore, with the technology described in JP-A No. 2006-293782, because the region of a whole face is displayed enlarged at the center of an image, the line of sight of a user will be kept relatively constant in comparison with the technologies described in JP-A Nos. 8-138024 and 2000-292852. However, because positions of the eyes of subjects, which are what many users would be looking at, are not given serious consideration, there is a problem in that the line of sight of a user cannot be tightly concentrated on one point.

SUMMARY OF THE INVENTION

The present invention has been devised in order to solve the problem described above, and an objective thereof is to enable browsing with a line of sight being maintained during browsing through photographic images.

An image display device of the present invention for achieving the above-described objective includes: an extraction component that extracts from photographic images a photographic image in which a face has been photographed; a calculation component that calculates a position of an eye in the photographic image extracted by the extraction component; an image processing component that performs image processing on the photographic image such that the position of the eye calculated by the calculation component will be at a predetermined position; and a display component that displays the photographic image which has been processed by the image processing component.

An image display method of the present invention includes: an extraction step of extracting from photographic images a photographic image in which a face has been photographed; a calculation step of calculating a position of an eye in the photographic image extracted in the extraction step; an image processing step of performing image processing on the photographic image such that the position of the eye calculated in the calculation step will be at a predetermined position; and a display step of displaying the photographic image which has been processed in the image processing step.

An image display program of the present invention causes image display processing to be executed at a computer, including: an extraction step of extracting from photographic images a photographic image in which a face has been photographed; a calculation step of calculating a position of an eye in the photographic image extracted in the extraction step; an image processing step of performing image processing on the photographic image such that the position of the eye calculated in the calculation step will be at a predetermined position; and a display step of displaying the photographic image which has been processed in the image processing step.

DETAILED DESCRIPTION OF THE INVENTION

Herebelow, examples of exemplary embodiments of the present invention will be described in detail with reference to the drawings. For these exemplary embodiments, the present invention is applied to a digital camera.

First Exemplary Embodiment

Figure 1:
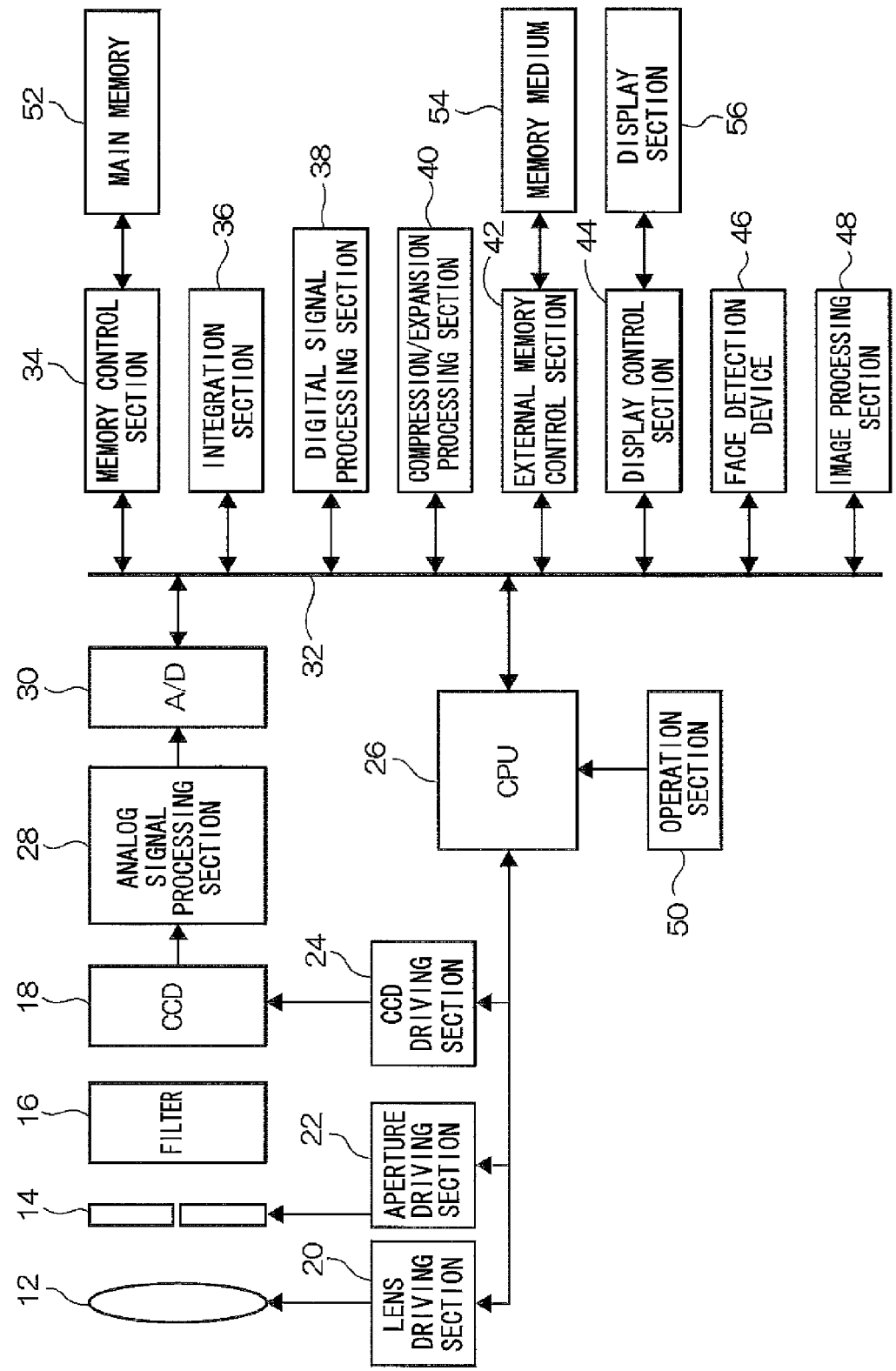
FIG. 1 is a block diagram showing schematic structure of a digital camera relating to a first exemplary embodiment of the present invention.

FIG. 1 is a block diagram showing schematic structure of a digital camera relating to a first exemplary embodiment of the present invention.

As shown in FIG. 1, a digital camera 10 relating to the first exemplary embodiment of the present invention is equipped with a photography lens 12. An aperture 14, a filter 16 and a charge-coupled device (below referred to as a CCD) 18 are disposed in this order along an optical axis behind the photography lens 12. The filter 16 includes an infrared cut filter and an optical low-pass filter or the like. A subject image is focused onto the CCD 18 by the photography lens 12.

At the photography lens 12, focus adjustment is implemented by a position of the photography lens 12 being adjusted by a lens driving section 20. At the aperture 14, an exposure amount onto the CCD 18 is adjusted by an opening amount of the aperture 14 being adjusted by an aperture driving section 22. At the CCD 18, charge accumulation is adjusted by a CCD driving section 24. The lens driving section 20, the aperture driving section 22 and the CCD driving section 24 are connected to a CPU 26, and are respectively controlled by the CPU 26.

An output terminal of the CCD 18 is connected to an analog signal processing section 28. Various kinds of analog signal processing are performed on analog signals inputted from the CCD 18 by the analog signal processing section 28.

An output terminal of the analog signal processing section 28 is connected to an analog/digital converter (A/D) 30, and analog signals inputted from the analog signal processing section 28 are converted to digital signals.

An output terminal of the A/D 30 is connected to a bus 32. The CPU 26, a memory control section 34, an integration section 36, a digital signal processing section 38, a compression/expansion processing section 40, an external memory control section 42, a display control section 44, a face detection device 46 and an image processing section 48 are connected to the bus 32. An operation section 50 is connected to the CPU 26, and each section is controlled by the CPU 26 in accordance with user operations at the operation section 50.

A main memory 52 is connected to the memory control section 34. The main memory 52 temporarily memorizes image data obtained by photography, and also functions as a work area when various kinds of processing are being applied to the image data.

The integration section 36 integrates the image data that has been converted into digital signals, for each of the colors R (red), G (green) and B (blue), and outputs the integrated values to the digital signal processing section 38.

The digital signal processing section 38 performs various kinds of digital signal processing (for example, gain correction, white balance correction and the like) on the image data that has been processed by the integration section 36.

The compression/expansion processing section 40 performs predetermined compression processing (for example, compression processing into the JPEG format or the like) on the image data that has been subjected to the various kinds of digital signal processing, and the like.

The external memory control section 42 controls memorization to an external memory medium 54 of the image data or the like that has been compressed by the compression/expansion processing section 40, and reading of image data that has been memorized at the memory medium 54 and the like.

The display control section 44 controls display of a photographic image, based on image data obtained by photographic imaging, at a display section 56, display of a through-image at the display section 56 during photography, and the like. For example, the display control section 44 controls such that photographic images are displayed in accordance with user operations at the operation section 50, and controls such that through-images are displayed during photography.

On the basis of image data obtained by photography, the face detection device 46 detects whether or not a person's face is present in a subject, and detects a face region. For the detection of a face region by the face detection device 46, for example: a range of color difference signals (chroma signals) corresponding to human skin is decided beforehand using a publicly known method; it is determined whether a skin color region is present or absent by determining whether or not color difference signals of pixels of the photographic image information are in this range; and if a proportion of a region with skin color relative to the subject represented by the photographic image information is at or above a pre-specified magnitude, the region with skin color is extracted to serve as a skin color region. Then, it is determined whether or not patterns which are not skin color, such as eyes, nose, mouth, eyebrows, etc. are included within pre-specified positional ranges in the extracted skin color region. If these patterns are included, then it can be determined that this skin color region is a face region.

The face detection device 46 also detects eye regions in detected face regions. For detection of an eye region, a conventionally known pupil detection process or the like may be employed. An eye region may also be detected by for example, comparison with a pre-specified pattern.

The image processing section 48 applies various kinds of image processing to the image data obtained by photography, such as image processing for display at the display section 56 and the like. In the present exemplary embodiment, the image processing section 48 performs image processing such as magnification, reduction, translation, rotation and the like on the photographic image such that a position of the eyes of a person in the photographic image will be at a predetermined position (for example, the middle of the image or the like).

Now, a display method when a photographic image obtained by photography with the digital camera 10 relating to the first exemplary embodiment of the present invention is to be displayed at the display section 56 will be described.

Figure 2A:
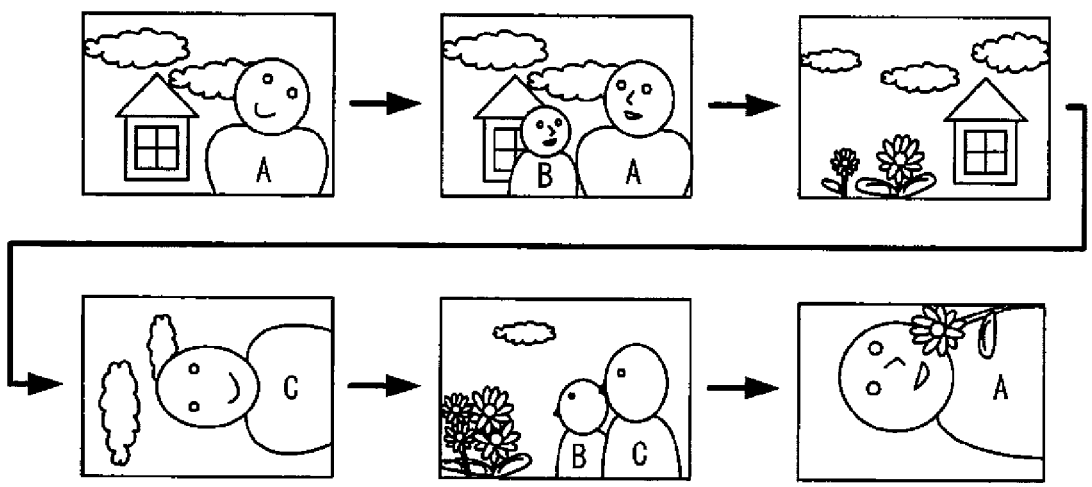
FIG. 2A to FIG. 2D are diagrams for explaining a display method when displaying, at a display section, photographic images obtained by photography with the digital camera relating to the first exemplary embodiment of the present invention.

Here, description will be given taking as an example a case in which a photographic image group obtained by photography is as shown in FIG. 2A.

Figure 2B:
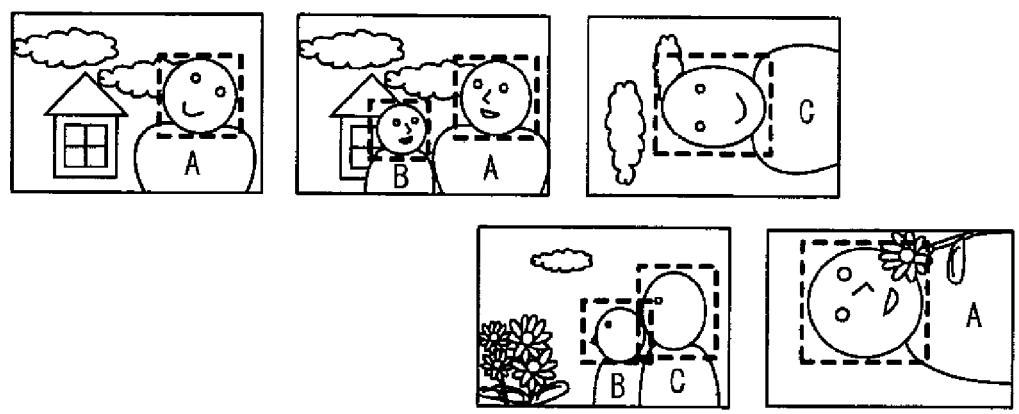

First, in the present exemplary embodiment, face detection for each photographic image in the photographic image group is performed by the face detection device 46, and photographic images in which faces of people are present are extracted and selected out (FIG. 2B).

In the selected out photographic images in which people's faces are present, regions of eyes in the faces are detected by the face detection device 46 from each photographic image, and photographic images in which pairs of eyes appear are extracted. A calculation of an eye region may give a central position of a rectangle containing eyes, and may give positions of pupils if a pupil detection component is included. In such a case, if pupils cannot be detected, the central position of the rectangle containing the eyes may be used.

Figure 2C:
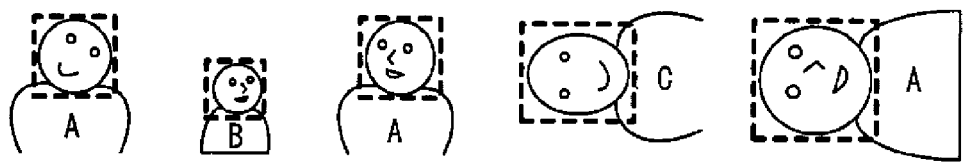
Figure 2D:
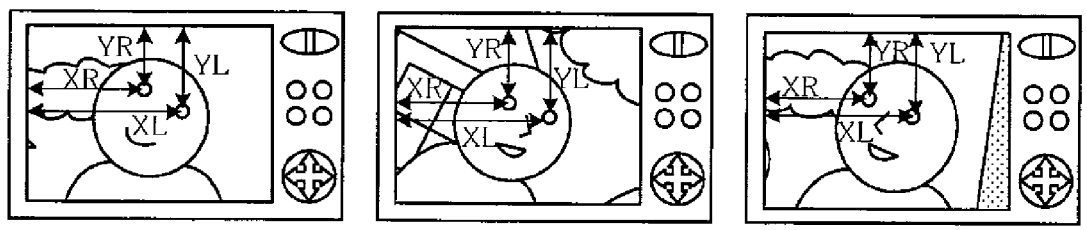

Next, photographic images in which pairs of eyes appear are extracted (FIG. 2C), and display positions, sizes, rotation angles and the like are adjusted by the image processing section 48 such that, in a particular image among the extracted photographic images, the left eye and right eye of a particular face that is to be displayed first will be displayed at predetermined positions on a screen (for example, a middle portion of the screen or the like), and for the rest of the face images, the left eyes and right eyes will be respectively displayed at the same positions as the display positions of the left eye and right eye when the particular image was displayed. The display control section 44 controls such that the adjusted photographic images are displayed at the display section 56 (FIG. 2D). That is, if the position of the right eye of the former face is at (XR,YR) in screen coordinates and a left eye is at (XL,YL), then, for all subsequent images, the images are adjusted and displayed such that the right eyes are at (XR,YR) and the left eyes are at (XL,YL). The positions of the left and right eyes of the photographic image that is displayed first may be such that this photographic image is displayed without alteration, or pre-specified image processing such that the eyes are close to the middle of the screen or the like may be performed for display.

Figure 3:
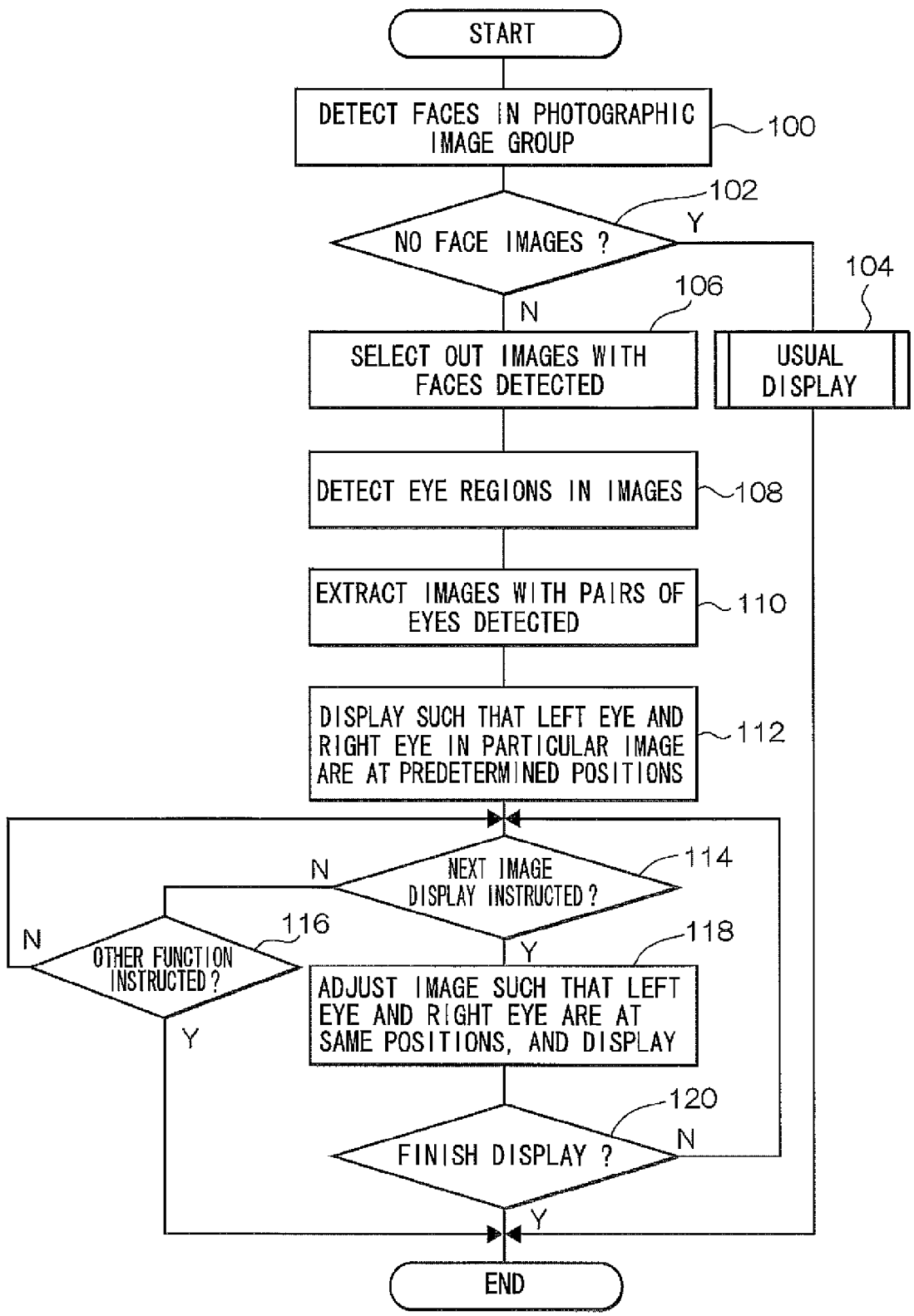
FIG. 3 is a flowchart showing an example of processing when displaying photographic images at the digital camera relating to the first exemplary embodiment of the present invention.

Next, display processing for times of displaying photographic images obtained by photography with the digital camera 10 relating to the first exemplary embodiment of the present invention, which is structured as described above, will be described in detail. FIG. 3 is a flowchart showing an example of processing when displaying photographic images at the digital camera 10 relating to the first exemplary embodiment of the present invention. The display processing of FIG. 3 is commenced when a pre-specified photographic image display mode is instructed by operation of the operation section 50, or the like.

First, in step 100, face detection is carried out by the face detection device 46 on the photographic image group, and the processing advances to step 102. For example: a range of color difference signals (chroma signals) corresponding to human skin is decided beforehand using a publicly known method; it is determined whether a skin color region is present or absent by determining whether or not color difference signals of pixels of the photographic image information are in this range; and if a proportion of a region with skin color relative to the subject represented by the photographic image information is at or above a pre-specified magnitude, the region with skin color is extracted to serve as a skin color region. Then, it is determined whether or not patterns which are not skin color, such as eyes, nose, mouth, eyebrows, etc. are included within pre-specified positional ranges in the extracted skin color region. If these patterns are included, then it can be determined that this skin color region is a face region. However, if faces were already detected during photography and face information has been recorded by tags or the like in the image data, this processing may be omitted.

In step 102, from the results of face detection by the face detection device 46, the CPU 26 determines whether there are no photographic images in which people's faces are present. If this determination is positive, the processing advances to step 104, and if negative, the processing advances to step 106.

In step 104, in a case in which no faces of people are present in the photographic image group, usual display is performed, and the sequence of display processing ends. Herein, usual display includes usual display processing, such as displaying the photographic images at the display section 56 and the like in accordance with operations of the operation section 50, for example, button-operations of arrow keys and the like.

In step 106, the photographic images in which faces have been detected by the face detection device 46 are selected out from the photographic image group, and the processing advances to step 108.

In step 108, eye regions in each photographic image are detected by the face detection device 46, and the processing advances to step 110. The eye regions may be detected by, for example, detecting eye regions by comparison with pre-specified patterns or the like.

In step 110, photographic images in which pairs of eyes have been detected by the detection of eye regions in step 108 are extracted from the photographic image group, and the processing advances to step 112.

In step 112, image processing is carried out by the image processing section 48 such that a left eye and right eye in a particular image will be at predetermined positions (for example, positions at the middle of the screen of the display section 56 or the like), this is displayed at the display section 56, and the processing advances to step 114. At this time, the photographic image may be suitably magnified by the image processing section 48. The particular image that is displayed in step 112 and a face image within the particular image that is to be displayed may be designated by a user by operation of the operation section 50, and may be automatically selected in accordance with date/time of photography or the like.

In step 114 it is determined by the CPU 26 whether or not display of a next face image has been instructed. For this determination, it is determined whether or not display of the next face image has been instructed by operation of the operation section 50 or the like. If this determination is negative, the processing advances to step 116, and if positive, the processing advances to step 118. Step 114 may also automatically determine whether or not there is a next face image.

In step 116, it is determined by the CPU 26 whether or not execution of another function of the digital camera 10 has been instructed by operation of the operation section 50 or the like. If this determination is positive, the sequence of processing ends and processing to execute the other function is carried out. If the determination is negative, the processing returns to step 114 and the processing described above is repeated.

In step 118, the next photographic image is adjusted by the image processing section 48 such that the left eye and right eye will be displayed at the same positions as the photographic image that was previously displayed, and is displayed. Then the processing advances to step 120.

In step 120, it is determined by the CPU 26 whether or not display is to end. For this determination, it is determined whether or not an instruction to execute another function or the like has been operated at the operation section 50, whether or not a power switch has been turned off, and the like. If this determination is negative, the processing returns to step 114 and the processing described above is repeated, and if positive, the sequence of display processing ends.

That is, with the digital camera 10 relating to the first exemplary embodiment of the present invention, when photographic images are to be displayed, photographic images in which people appear are extracted and are displayed with positions of eyes of the people at matching positions. Thus, the photographic images may be browsed, by frame-advance or running a slide show, with the line of sight of a browsing user staying constant.

Moreover, particularly in a slide show or the like, if crossfades are used for switching between images (a technique in which two images are overlappingly displayed in the course of sequential switching), because the switching is done about the eye positions, an effect similar to morphing (an image changing from one person to another person in a natural manner) can be obtained.

Second Exemplary Embodiment

Next, a digital camera relating to a second exemplary embodiment of the present invention will be described. Structure of the digital camera is the same as in the first exemplary embodiment and only a photographic image display method differs, so only differences will be described.

In the first exemplary embodiment, photographic images in which faces of people appear are selected out from a photographic image group, and each photographic image is displayed such that eyes of the people are at the same positions. In the present exemplary embodiment however, displayed face regions of the same person are extracted and displayed.

Figure 4A:
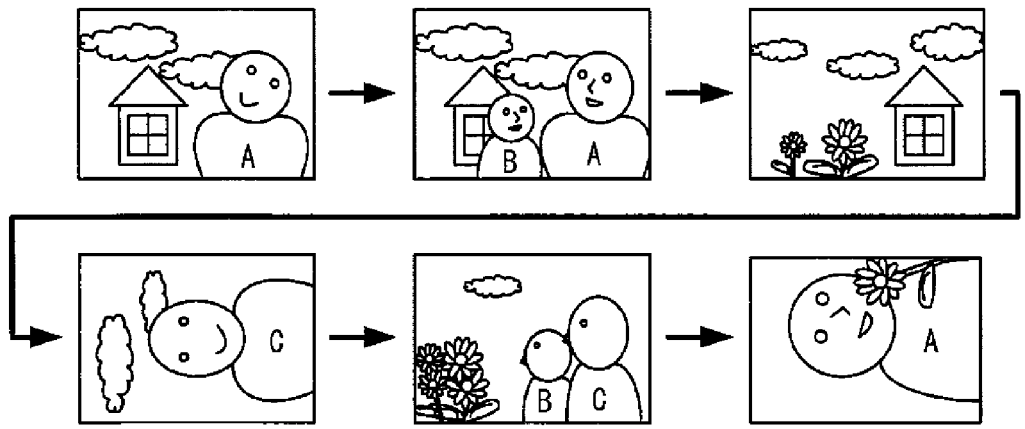
FIG. 4A to FIG. 4D are diagrams for explaining a display method when displaying, at a display section, photographic images obtained by photography with a digital camera relating to a second exemplary embodiment of the present invention.
Figure 4B:
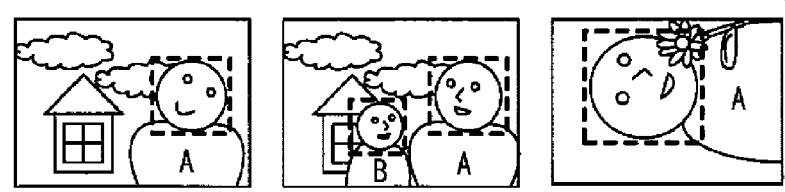

Specifically, if a photographic image group obtained by photography is, for example, the case shown in FIG. 4A, face detection is performed by the face detection device 46 on each photographic image in the photographic image group, photographic images in which faces of people are present are extracted, and photographic images in which a particular person appears are selected out (FIG. 4B). Detection of a particular person may be by, for example, calculating correlations of face regions or the like and using degrees of similarity of faces to identify the same person, and in a case in which comments or the like have been recorded beforehand by tags in the photographic images or the like, the same person may be identified using these.

Then, in a similar manner to the first exemplary embodiment, regions of eyes of the faces in the selected out photographic images are detected by the face detection device 46. A calculation of an eye region may give a central position of a rectangle containing the eyes, and may give positions of pupils if a pupil detection component is included. In such a case, if pupils cannot be detected, the central position of the rectangle containing the eyes may be used.

Figure 4C:
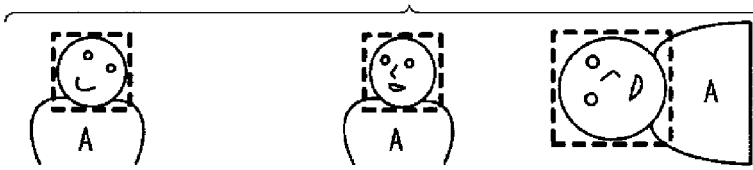
Figure 4D:
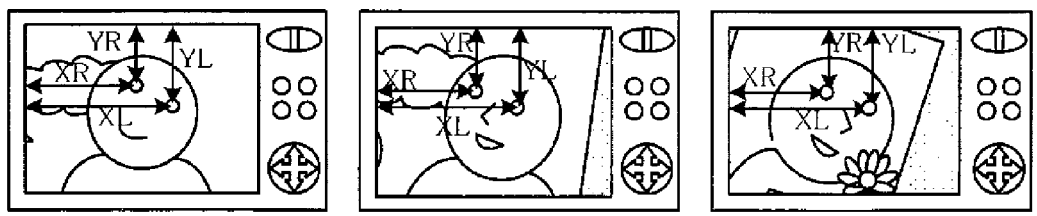

Then, photographic images in which the pair of eyes of the particular person appears in each photographic image are extracted (FIG. 4C), and display positions, sizes, rotation angles and the like of the photographic images are adjusted by the image processing section 48 such that, in a particular image among the extracted photographic images, the left eye and right eye of the particular face that is to be displayed first will be displayed at predetermined positions on the screen (for example, a middle portion of the screen or the like), and for the rest of the face images, the left eyes and right eyes will be respectively displayed at the same positions as the display positions of the left eye and right eye when the particular image was displayed. The display control section 44 controls such that the adjusted photographic images are displayed at the display section 56 (FIG. 4D).

Figure 5:
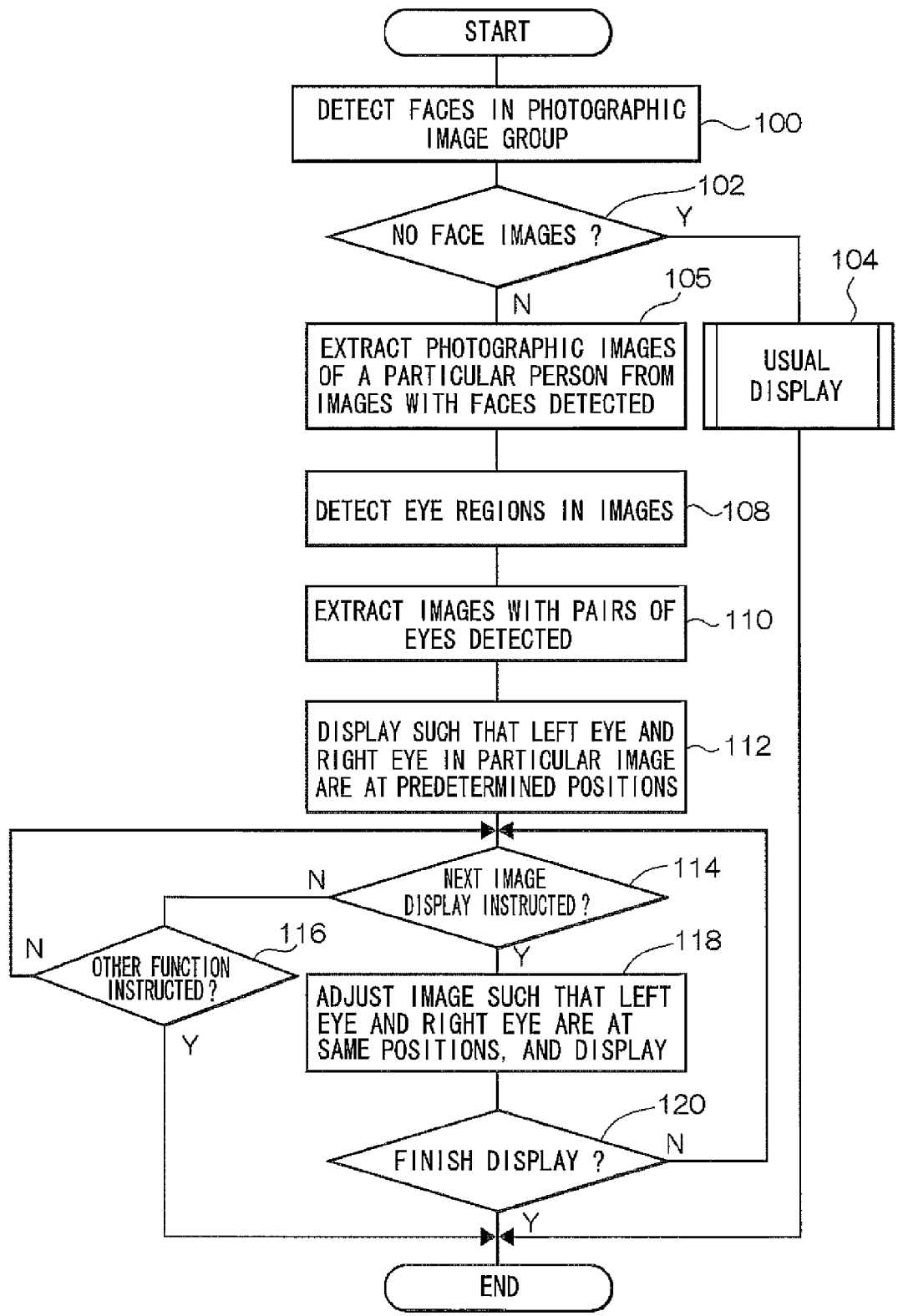
FIG. 5 is a flowchart showing an example of processing when displaying photographic images at the digital camera relating to the second exemplary embodiment of the present invention.

Next, processing for times of displaying photographic images obtained by photography with the digital camera relating to the second exemplary embodiment of the present invention will be described. FIG. 5 is a flowchart showing an example of processing when displaying photographic images at the digital camera relating to the second exemplary embodiment of the present invention. The display processing of FIG. 5 is commenced when a pre-specified photographic image display mode is instructed by operation of the operation section 50, or the like. Processing the same as in the first exemplary embodiment is assigned the same reference numerals, and is described First, in step 100, face detection is carried out by the face detection device 46 on the photographic image group, and the processing advances to step 102. For example: a range of color difference signals (chroma signals) corresponding to human skin is decided beforehand using a publicly known method; it is determined whether a skin color region is present or absent by determining whether or not color difference signals of pixels of the photographic image information are in this range; and if a proportion of a region with skin color relative to the subject represented by the photographic image information is at or above a pre-specified magnitude, the region with skin color is extracted to serve as a skin color region. Then, it is determined whether or not patterns which are not skin color, such as eyes, nose, mouth, eyebrows, etc. are included within pre-specified positional ranges in the extracted skin color region. If these patterns are included, then it can be determined that this skin color region is a face region. However, if faces were already detected during photography and face information has been recorded by tags or the like in the image data, this processing may be omitted.

In step 102, from the results of face detection by the face detection device 46, the CPU 26 determines whether there are no photographic images in which people's faces are present. If this determination is positive, the processing advances to step 104, and if negative, the processing advances to step 105.

In step 104, in a case in which no faces of people are present in the photographic image group, usual display is performed, and the sequence of display processing ends. Herein, usual display includes usual display processing, such as displaying the photographic images at the display section 56 and the like in accordance with operations of the operation section 50, for example, button-operations of arrow keys and the like.

In step 105, from the photographic images in which faces have been detected by the face detection device 46, only photographic images of a particular person are extracted, and the processing advances to step 108. For extraction of the particular person, for example, degrees of similarity of faces are calculated by finding correlation values of face regions or the like, whether or not the faces are a particular person is determined, and these may be extracted. For selection of the particular person, a user may designate the particular person by operation of the operation section 50, or a person who is included in the greatest number of the photographic image group, a person whose first face area in a starting photographic image appears largest or the like may be automatically extracted and selected.

In step 108, eye regions in each photographic image are detected by the face detection device 46, and the processing advances to step 110. The eye regions may be detected by, for example, detecting eye regions by comparison with pre-specified patterns or the like.

In step 110, photographic images in which pairs of eyes have been detected by the detection of eye regions in step 108 are extracted from the photographic image group, and the processing advances to step 112.

In step 112, image processing is carried out by the image processing section 48 such that a left eye and right eye in a particular image will be at predetermined positions (for example, positions at the middle of the screen of the display section 56 or the like), this is displayed at the display section 56, and the processing advances to step 114. At this time, the photographic image may be suitably magnified by the image processing section 48. The particular image that is displayed in step 112 and the face image within the particular image that is to be displayed may be designated by a user by operation of the operation section 50, and may be automatically selected in accordance with date/time of photography or the like.

In step 114 it is determined by the CPU 26 whether or not display of a next face image has been instructed. For this determination, it is determined whether or not display of the next face image has been instructed by operation of the operation section 50 or the like. If this determination is negative, the processing advances to step 116, and if positive, the processing advances to step 118. Step 114 may also automatically determine whether or not there is a next face image.

In step 116, it is determined by the CPU 26 whether or not execution of another function of the digital camera has been instructed by operation of the operation section 50 or the like. If this determination is positive, the sequence of processing ends and processing to execute the other function is carried out. If the determination is negative, the processing returns to step 114 and the processing described above is repeated.

In step 118, the next photographic image is adjusted by the image processing section 48 such that the left eye and right eye will be displayed at the same positions as the photographic image that was previously displayed, and is displayed. Then the processing advances to step 120. Here, the photographic image that is displayed next may be such that the photographic images are displayed in order of photography time/date, and may be such that the photographic images are displayed in order of degrees of similarity of the faces.

In step 120, it is determined by the CPU 26 whether or not display is to end. For this determination, it is determined whether or not an instruction to execute another function or the like has been operated at the operation section 50, whether or not a power switch has been turned off, and the like. If this determination is negative, the processing returns to step 114 and the processing described above is repeated, and if positive, the sequence of display processing ends.

That is, with the present exemplary embodiment, because only the same person is extracted from the photographic image group and displayed, the switching is more natural than in the first exemplary embodiment. Moreover, if photographic images which have been taken and kept over a long period are displayed in date order, viewing with an awareness of stages of growth or the like of the particular person is possible, viewing is more enjoyable, and enjoyment in continuing to take pictures can be increased.

Third Exemplary Embodiment

Next, a digital camera relating to a third exemplary embodiment of the present invention will be described. Structure of the digital camera is the same as in the first exemplary embodiment and only a photographic image display method differs, so only differences will be described.

In the first exemplary embodiment, photographic images in which faces of people appear are selected out from a photographic image group, and each photographic image is displayed such that eyes of the people are at the same positions. In the present exemplary embodiment however, in contrast to the first exemplary embodiment, only images in which a face angle is a particular angle are displayed.

Figure 6A:
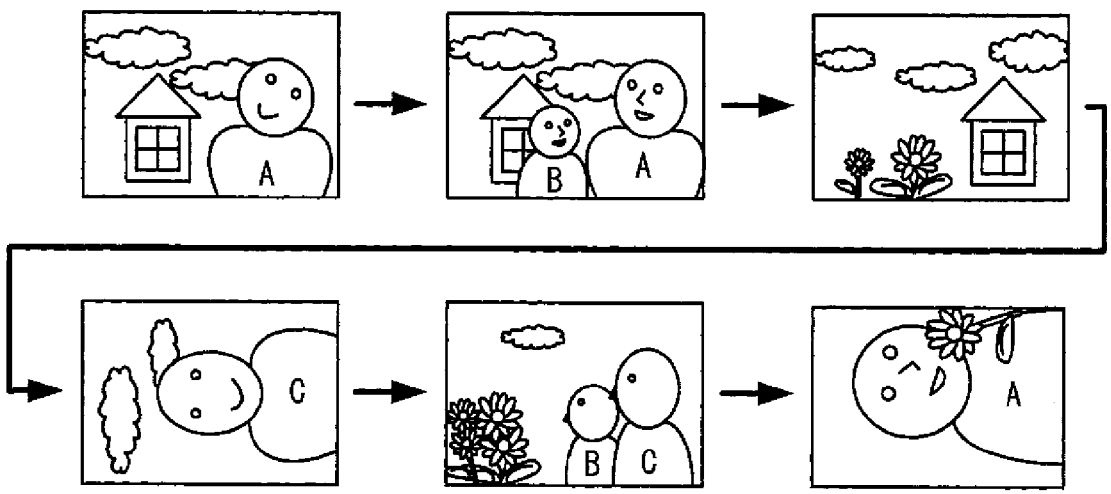
FIG. 6A to FIG. 6D are diagrams for explaining a display method when displaying, at a display section, photographic images obtained by photography with a digital camera relating to a third exemplary embodiment of the present invention.
Figure 6B:
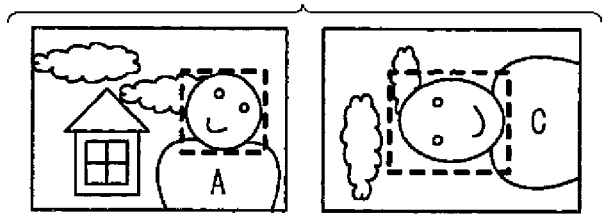

Specifically, if a photographic image group obtained by photography is, for example, the case shown in FIG. 6A, face detection is carried out by the face detection device 46 on each photographic image in the photographic image group, photographic images in which faces of people are present are extracted, and photographic images in which faces with a particular angle appear are selected out (FIG. 6B). Which face angle the photographic images are to be selected out for may be selected by a user by operation of the operation section 50, or an angle that is most frequently included in the photographic image group may be automatically selected. Angles of faces may be detected from positional relationships of eyes, nose, mouth, etc. relative to the face region, inclinations of the face regions and the like.

Then, in a similar manner to the first exemplary embodiment, regions of eyes of the faces in the selected photographic images are detected by the face detection device 46. A calculation of an eye region may give a central position of a rectangle containing the eyes, and may give positions of pupils if a pupil detection component is included. In such a case, if pupils cannot be detected, the central position of the rectangle containing the eyes may be used.

Figure 6C:
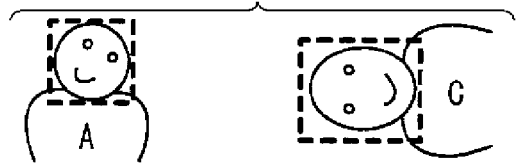
Figure 6D:
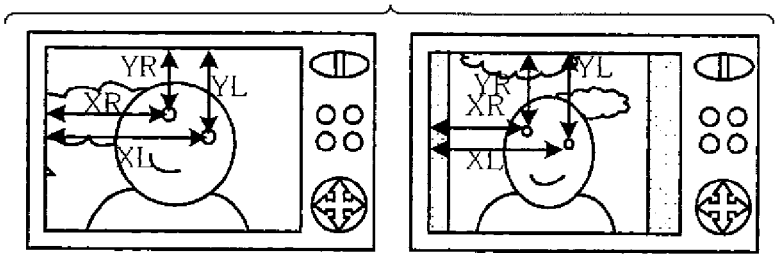

Then, photographic images in which pairs of eyes of people appear with a particular face angle in each photographic image are extracted (FIG. 6C), and display positions, sizes, rotation angles and the like of the photographic images are adjusted by the image processing section 48 such that, in a particular image among the extracted photographic images, the left eye and right eye of a particular face that is to be displayed first will be displayed at predetermined positions on the screen (for example, a middle portion of the screen or the like), and for the rest of the face images, the left eyes and right eyes will be respectively displayed at the same positions as the display positions of the left eye and right eye when the particular image was displayed. The display control section 44 controls such that the adjusted photographic images are displayed at the display section 56 (FIG. 6D).

Figure 7:
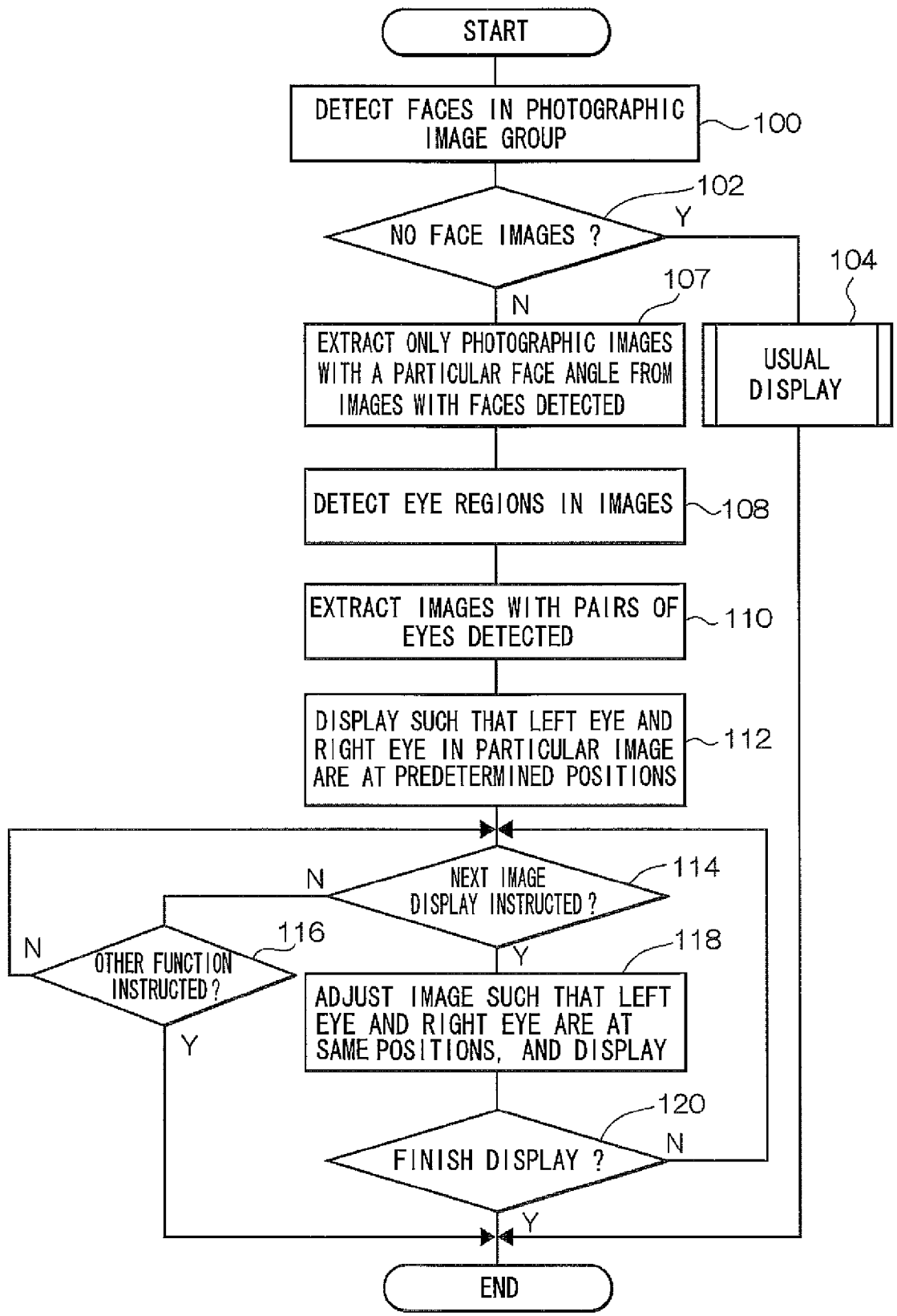
FIG. 7 is a flowchart showing an example of processing when displaying photographic images at the digital camera relating to the third exemplary embodiment of the present invention.

Next, processing for times of displaying photographic images obtained by photography with the digital camera relating to the third exemplary embodiment of the present invention will be described. FIG. 7 is a flowchart showing an example of processing when displaying photographic images at the digital camera relating to the third exemplary embodiment of the present invention. The display processing of FIG. 7 is commenced when a pre-specified photographic image display mode is instructed by operation of the operation section 50, or the like. Processing the same as in the first exemplary embodiment is assigned the same reference numerals, and is described First, in step 100, face detection is carried out by the face detection device 46 on the photographic image group, and the processing advances to step 102. For example: a range of color difference signals (chroma signals) corresponding to human skin is decided beforehand using a publicly known method; it is determined whether a skin color region is present or absent by determining whether or not color difference signals of pixels of the photographic image information are in this range; and if a proportion of a region with skin color relative to the subject represented by the photographic image information is at or above a pre-specified magnitude, the region with skin color is extracted to serve as a skin color region. Then, it is determined whether or not patterns which are not skin color, such as eyes, nose, mouth, eyebrows, etc. are included within pre-specified positional ranges in the extracted skin color region. If these patterns are included, then it can be determined that this skin color region is a face region. However, if faces were already detected during photography and face information has been recorded by tags or the like in the image data, this processing may be omitted.

In step 102, from the results of face detection by the face detection device 46, the CPU 26 determines if there are no photographic images in which people's faces are present. If this determination is positive, the processing advances to step 104, and if negative, the processing advances to step 107.

In step 104, in a case in which no faces of people are present in the photographic image group, usual display is performed, and the sequence of display processing ends. Herein, usual display includes usual display processing, such as displaying the photographic images at the display section 56 and the like in accordance with operations of the operation section 50, for example, button-operations of arrow keys and the like.

In step 107, from the photographic images in which faces have been detected by the face detection device 46, only photographic images with a particular face angle are extracted, and the processing advances to step 108. Angles of faces may be detected from, for example, positional relationships of eyes, nose, mouth, etc. relative to the face region, inclinations of the face regions and the like. For selection of the particular face angle, a user may select an angle by operation of the operation section 50, and an angle that is most frequently included in the photographic image group may be automatically selected.

In step 108, eye regions in each photographic image are detected by the face detection device 46, and the processing advances to step 110. The eye regions may be detected by, for example, detecting eye regions by comparison with pre-specified patterns or the like.

In step 110, photographic images in which pairs of eyes have been detected by the detection of eye regions in step 108 are extracted from the photographic image group, and the processing advances to step 112.

In step 112, image processing is carried out by the image processing section 48 such that a left eye and right eye in a particular image will be at predetermined positions (for example, positions at the middle of the screen of the display section 56 or the like), this is displayed at the display section 56, and the processing advances to step 114. At this time, the photographic image may be suitably magnified by the image processing section 48. The particular image that is displayed in step 112 and a face image within the particular image that is to be displayed may be designated by a user by operation of the operation section 50, and may be automatically selected in accordance with date/time of photography or the like.

In step 114 it is determined by the CPU 26 whether or not display of a next face image has been instructed. For this determination, it is determined whether or not display of the next face image has been instructed by operation of the operation section 50 or the like. If this determination is negative, the processing advances to step 116, and if positive, the processing advances to step 118. Step 114 may also automatically determine whether or not there is a next face image.

In step 116, it is determined by the CPU 26 whether or not execution of another function of the digital camera has been instructed by operation of the operation section 50 or the like. If this determination is positive, the sequence of processing ends and processing to execute the other function is carried out. If the determination is negative, the processing returns to step 114 and the processing described above is repeated.

In step 118, the next photographic image is adjusted by the image processing section 48 such that the left eye and right eye will be displayed at the same positions as the photographic image that was previously displayed, and is displayed. Then the processing advances to step 120. Here, the photographic image that is displayed next may be such that the photographic images are displayed in order of photography time/date, and may be such that the photographic images are displayed in order of degrees of similarity of the faces.

In step 120, it is determined by the CPU 26 whether or not display is to end. For this determination, it is determined whether or not an instruction to execute another function or the like has been operated at the operation section 50, whether or not a power switch has been turned off, and the like. If this determination is negative, the processing returns to step 114 and the processing described above is repeated, and if positive, the sequence of display processing ends.

That is, with the present exemplary embodiment, because only photographic images with a particular face angle are extracted from the photographic image group and displayed, an effect closer to morphing than in the first exemplary embodiment and the second exemplary embodiment can be provided.

Figure 8A:
FIG. 8A to FIG. 8F are diagrams for explaining a display method of a variant example.
Figure 8B:
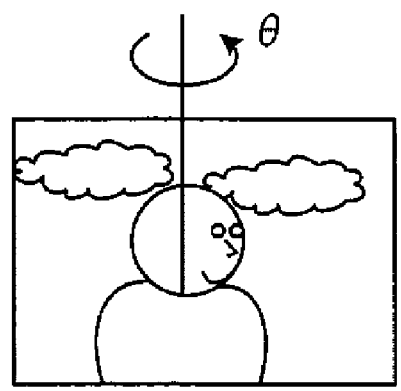
Figure 8C:
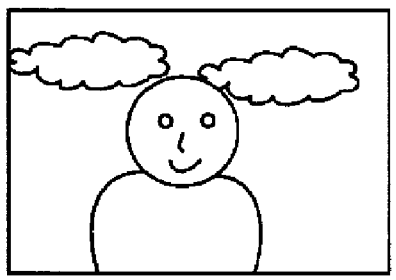
Figure 8D:
Figure 8E:
Figure 8F:
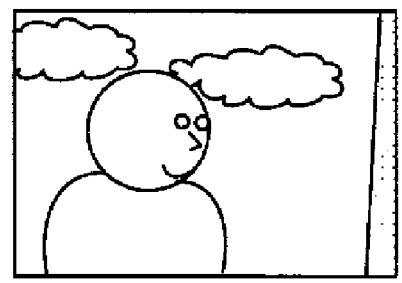

Now, in the exemplary embodiments described above, when a next photographic image is displayed after a particular photographic image, the next photographic image is displayed with image processing such that positions of eyes are at the same positions as in the particular photographic image. Therefore, if a distance between a pair of eyes in the particular photographic image is d1, and the distance between the pair of eyes in the next photographic image is d2, the face image is displayed magnified by d1/d2. However, as shown in, for example, FIG. 8A and FIG. 8B, in a case in which an angle about a vertical direction rotation axis of the face in the next photographic image (FIG. 8B) has turned by θ° from the particular photographic image (FIG. 8A), if one of the first to third exemplary embodiments is employed, then the next photographic image (FIG. 8D) will be unnaturally magnified relative to the particular photographic image (FIG. 8C). Therefore, the angle of a face may be calculated and a width of the pair of eyes if the face were facing directly forward inferred, and image processing performed for display such that the width of the pair of eyes in the face in each photographic image is an inferred width. For example, in the case of FIG. 8A to FIG. 8F, when the next photographic image is displayed, it is magnified by (d1×cos θ)/d2. Accordingly, as shown in FIG. 8E and FIG. 8F, the size of the face will not unnaturally fluctuate. Hence, although the positions of the pair of eyes do not strictly match, because a change in the width of the pair of eyes is smaller than a change in the size of the face, less disruption is felt by the person looking at the images. In such a case, when a photographic image in which a face has turned is displayed, the eye that is at the camera side of the face which is at an angled direction may be made to match the position of that eye in the preceding photographic image, may be made to match the position of the other eye, or may be made to match a midpoint of the pair of eyes. Here, the turning angle of a face about the vertical direction rotation axis may be detected by a determination by, for example, inference from a balance of positions of the eyes, nose, mouth, etc. in the face region, or the like.

Figure 9:
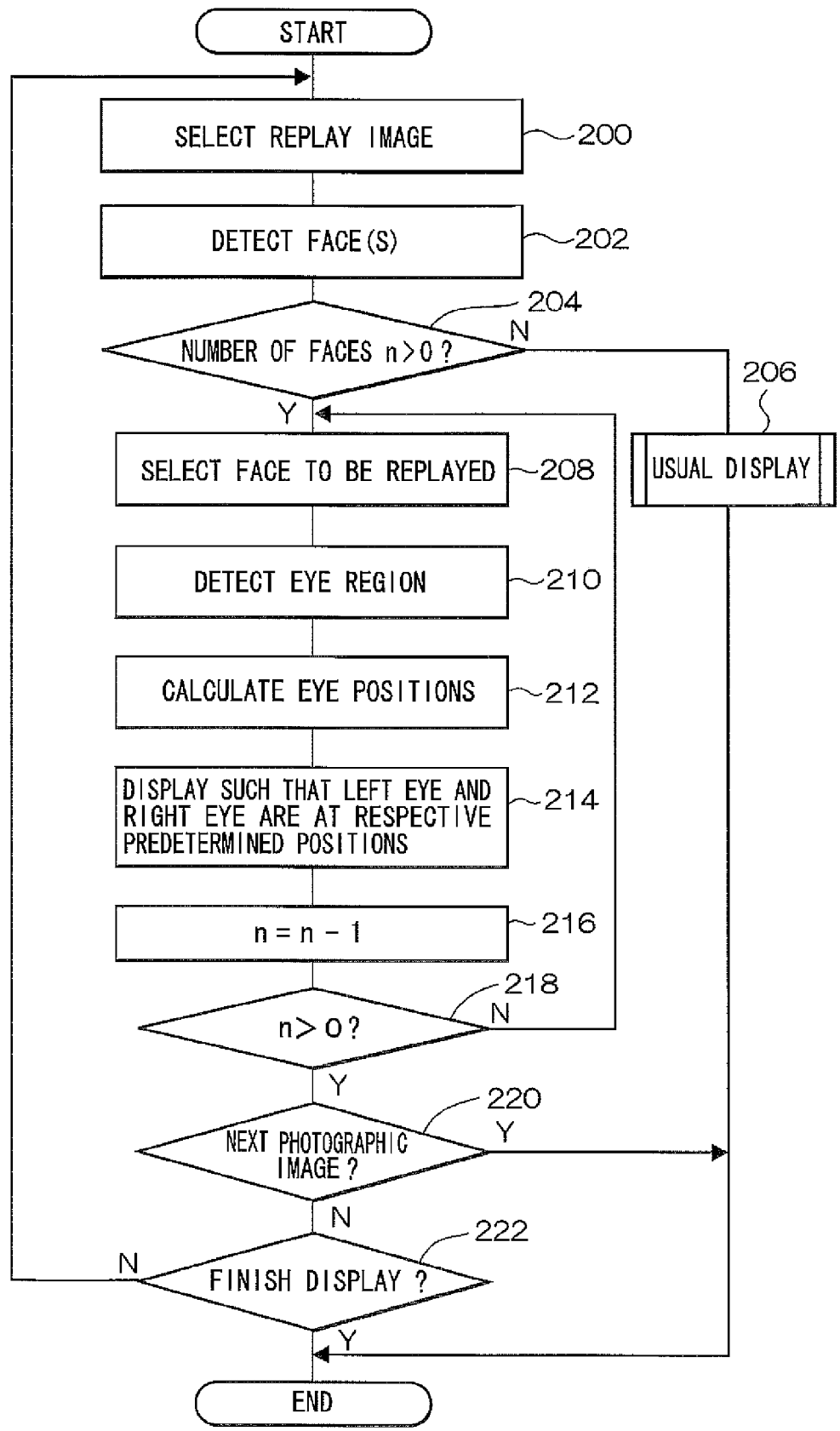
FIG. 9 is a flowchart showing an example of display processing of the variant example.

Further, in the exemplary embodiments described above, face images are detected in a photographic image group. However, this is not a limitation, and face detection may be performed for each individual photographic image. For example, in the first exemplary embodiment, display processing as illustrated in a flowchart shown in FIG. 9 may be performed.

That is, in step 200, replay image selection is performed, and the processing advances to step 202. The replay image selection may make a selection in accordance with operation of the operation section 50 by a user, and may automatically make a selection in accordance with a sequence of photography or the like.

In step 202, face detection is performed by the face detection device 46, and the processing advances to step 204. For example: a range of color difference signals (chroma signals) corresponding to human skin is decided beforehand using a publicly known method; it is determined whether a skin color region is present or absent by determining whether or not color difference signals of pixels of the photographic image information are in this range; and if a proportion of a region with skin color relative to the subject represented by the photographic image information is at or above a pre-specified magnitude, the region with skin color is extracted to serve as a skin color region. Then, it is determined whether or not patterns which are not skin color, such as eyes, nose, mouth, eyebrows, etc. are included within pre-specified positional ranges in the extracted skin color region. If these patterns are included, then it can be determined that this skin color region is a face region. However, if faces were already detected during photography and face information has been recorded by tags or the like in the image data, this processing may be omitted.

In step 204, the CPU 26 determines whether or not a number of faces n detected in the photographic image is greater than zero. If this determination is negative, the processing advances to step 206, and if positive, the processing advances to step 208.

In step 206, in a case in which no faces of people are present in the photographic image group, usual display is performed, and the sequence of display processing ends. Herein, usual display includes usual display processing, such as displaying the photographic image at the display section 56 and the like in accordance with operations of the operation section 50, for example, button-operations of arrow keys and the like.

On the other hand, in step 208, a face image to be replayed is selected, and the processing advances to step 210. For the selection of the face image to be replayed, the face image may be selected in accordance with operation of the operation section 50 by a user, and may be automatically selected from a pre-specified position of the photographic image.

In step 210, an eye region in the photographic image is detected by the face detection device 46, and the processing advances to step 212. The eye region may be detected by, for example, detecting an eye region by comparison with pre-specified patterns or the like.

In step 212, positions of the eye region of step 210 are detected by the face detection device 46, and the processing advances to step 214.

In step 214, image processing is carried out by the image processing section 48 such that a left eye and right eye will be at predetermined positions (for example, positions at the middle of the screen of the display section 56 or the like), this is displayed at the display section 56, and the processing advances to step 216. At this time, the photographic image may be suitably magnified by the image processing section 48.

In step 216, the number of faces n is decremented by 1. The processing advances to step 218, and it is determined by the CPU 26 whether or not the number of faces n is still greater than zero. If this determination is negative, the processing returns to step 208, and the processing described above is repeated until there are no more faces that have not been displayed in the photographic image. If the determination in step 218 is positive, the processing advances to step 220.

In step 220 it is determined by the CPU 26 whether or not there is a next photographic image to be displayed. If this determination is negative, the processing advances to step 222, and if positive, the sequence of display processing ends.

In step 222, it is determined by the CPU 26 whether or not display is to end. For this determination, it is determined whether or not an instruction to execute another function or the like has been operated at the operation section 50, whether or not a power switch has been turned off, and the like. If this determination is negative, the processing returns to step 200 and the processing described above is repeated, and if positive, the sequence of display processing ends.

By carrying out this display processing too, frame-advance or a slide show may be implemented with positions of eyes staying continually constant. Moreover, in a slide show or the like, if cross-fades are used for switching between images (the technique in which two images are overlappingly displayed in the course of sequential switching), because the switching is done about the eye positions, an effect similar to morphing (an image changing from one person to another person in a natural manner) can be obtained.

The above-described exemplary embodiments have been described respectively separately, but this is not limiting and the exemplary embodiments may be suitably combined. For example, the exemplary embodiments may be respectively different modes which are selectable as display modes at the operation section 50.

An image display device of a first aspect of the present invention includes: an extraction component that extracts from photographic images a photographic image in which a face has been photographed; a calculation component that calculates a position of an eye in the photographic image extracted by the extraction component; an image processing component that performs image processing on the photographic image such that the position of the eye calculated by the calculation component will be at a predetermined position; and a display component that displays the photographic image which has been processed by the image processing component.

According to the invention of the first aspect, the extraction component extracts photographic images in which faces have been photographed from the photographic images. The faces are detected in the photographic images and extracted by, for example, employing a previously known technology.

The calculation component calculates positions of eyes in the photographic images which have been extracted by the extraction component. For example, an eye region is detected by comparison with a pre-specified pattern and positions of the eyes are calculated.

The image processing component carries out image processing on a photographic image such that a calculated eye position will be at a predetermined position (for example, a central position of a displaying screen or the like, or a position the same as a position of eyes in a preceding photographic image or the like). For the image processing, image processing is performed such that the photographic image will be at a predetermined position, for example, by carrying out image processing including at least one of magnification, reduction, translation and rotation, as in the invention in a thirteenth aspect.

Then, the display component displays the photographic image that has been processed by the image processing component. That is, the photographic image which has been subjected to image processing by the image processing component such that the position of the eyes of a person included in the photographic image is at the predetermined position is displayed. Thus, when photographic images that show a person are being browsed, the positions of the eyes of the subject are considered, and positions of the eyes in the photographic images displayed at the display component are at the predetermined position. Therefore, during browsing of the photographic images, browsing with a line of sight being kept constant is possible.

The invention in the first aspect may, as in the invention in a second aspect, further include a selection component that selects a photographic image to be displayed at the display component, and may, as in the invention in a third aspect, display photographic images in a predetermined sequence (for example, photography time/date order or the like).

The extraction component and the calculation component may be formed such that, as in the invention in a fourth aspect, the extraction component extracts a photographic image in which a face including left and right eyes has been photographed, and the calculation component calculates positions of the left and right eyes.

As in the invention in a fifth aspect, the calculation component may calculate a central position of a rectangular region including the eye. As in the invention in a sixth aspect, the calculation component may include a pupil detection component that detects a pupil, and the calculation component calculate a position of the pupil detected by the pupil detection component to serve as the position of the eye. In such a case, if the pupil detection component cannot detect a pupil, then as in the invention in a seventh aspect, the calculation component may calculate a central position of a rectangular region including the eye to serve as the position of the eye.

The extraction component, the calculation component, the image processing component and the display component may be formed such that, as in the invention in an eighth aspect, the extraction component extracts, from a photographic image group including a plurality of photographic images, photographic images in which a face has been photographed, to serve as a face photographic image group, the calculation component calculates a position of an eye in each photographic image of the face photographic image group, the image processing component performs image processing on each photographic image of the face photographic image group, and the display component displays each photographic image of the face photographic image group.

The display component may be formed such that, as in the invention in a ninth aspect, the display component displays the photographic image which has been processed by the image processing component when the display component is in a pre-specified display mode.

The extraction component may be formed such that, as in the invention in a tenth aspect, the extraction component further extracts a photographic image that includes a particular person, and may be formed such that, as in the invention in an eleventh aspect, the extraction component further extracts a photographic image that includes a face with a particular angle.

The image processing component may be formed such that, as in the invention in a twelfth aspect, the image processing component estimates a rotation of the face about a vertical direction rotation axis in the photographic image, estimates, from an estimated distance of a pair of eyes, a distance of the pair of eyes if the face were facing directly forward, and performs image processing such that the distance of the pair of eyes will be a pre-specified target distance.

An image display method of a fourteenth aspect of the present invention includes: an extraction step of extracting from photographic images a photographic image in which a face has been photographed; a calculation step of calculating a position of an eye in the photographic image extracted in the extraction step; an image processing step of performing image processing on the photographic image such that the position of the eye calculated in the calculation step will be at a predetermined position; and a display step of displaying the photographic image which has been processed in the image processing step.

According to the invention of the fourteenth aspect, the extraction step extracts photographic images in which faces have been photographed from the photographic images. The faces are detected in the photographic images and extracted by, for example, employing a previously known technology.

The calculation step calculates positions of eyes in the photographic images which have been extracted by the extraction step. For example, an eye region is detected by comparison with a pre-specified pattern and positions of the eyes are calculated.

The image processing step carries out image processing on a photographic image such that a calculated eye position will be at a predetermined position (for example, a central position of a displaying screen or the like, or a position the same as a position of eyes in a preceding photographic image or the like). For the image processing, image processing is performed such that the photographic image will be at a predetermined position, for example, by carrying out image processing including at least one of magnification, reduction, translation and rotation, as in the invention in a twenty-sixth aspect.

Then, the display step displays the photographic image that has been processed in the image processing step. That is, the photographic image which has been subjected to image processing in the image processing step such that the position of the eyes of a person included in the photographic image is at the predetermined position is displayed. Thus, when photographic images that show a person are being browsed, the positions of the eyes of the subject are considered, and positions of the eyes in the photographic images displayed in the display step are at the predetermined position. Therefore, during browsing of the photographic images, browsing with a line of sight being kept constant is possible.

The invention in the fourteenth aspect may, as in the invention in a fifteenth aspect, further include a selection step of selecting a photographic image to be displayed in the display step, and, as in the invention in a sixteenth aspect, the display step may include displaying photographic images in a predetermined sequence (for example, photography time/date order or the like).

The extraction step and the calculation step may be such that, as in the invention in a seventeenth aspect, the extraction step includes extracting a photographic image in which a face including left and right eyes has been photographed, and the calculation step includes calculating positions of the left and right eyes.

As in the invention in an eighteenth aspect, the calculation component may include calculating a central position of a rectangular region including the eye. As in the invention in a nineteenth aspect, the calculation step may include detecting a pupil, and calculating a position of the pupil to serve as the position of the eye. In such a case, if a pupil cannot be detected, then as in the invention in a twentieth aspect, the calculation step may calculate a central position of a rectangular region including the eye to serve as the position of the eye.

The extraction step, the calculation step, the image processing step and the display step may be such that, as in the invention in a twenty-first aspect, the extraction step includes extracting, from a photographic image group including a plurality of photographic images, photographic images in which a face has been photographed, to serve as a face photographic image group, the calculation step includes calculating the position of an eye in each photographic image of the face photographic image group, the image processing step includes performing image processing on each photographic image of the face photographic image group, and the display step includes displaying each photographic image of the face photographic image group.

The display step may be such that, as in the invention in a twenty-second aspect, the display step includes displaying the photographic image which has been processed in the image processing step when in a pre-specified display mode.

The extraction step may, as in the invention in a twenty-third aspect, include further extracting a photographic image that includes a particular person, and may, as in the invention in a twenty-fourth aspect, include further extracting a photographic image that includes a face with a particular angle.

The image processing step may be such that, as in the invention in a twenty-fifth aspect, the image processing step includes estimating a rotation of the face about a vertical direction rotation axis in the photographic image, estimating, from an estimated distance of a pair of eyes, a distance of the pair of eyes if the face were facing directly forward, and performing image processing such that the distance of the pair of eyes will be a pre-specified target distance.

An image display program stored at a storage medium of a twenty-seventh aspect of the present invention causes image display processing to be executed at a computer, including: an extraction step of extracting from photographic images a photographic image in which a face has been photographed; a calculation step of calculating a position of an eye in the photographic image extracted in the extraction step; an image processing step of performing image processing on the photographic image such that the position of the eye calculated in the calculation step will be at a predetermined position; and a display step of displaying the photographic image which has been processed in the image processing step.

According to the invention of the twenty-seventh aspect, the extraction step extracts photographic images in which faces have been photographed from the photographic images. The faces are detected in the photographic images and extracted by, for example, employing a previously known technology.

The calculation step calculates positions of eyes in the photographic images which have been extracted by the extraction step. For example, an eye region is detected by comparison with a pre-specified pattern and positions of the eyes are calculated.

The image processing step carries out image processing on a photographic image such that a calculated eye position will be at a predetermined position (for example, a central position of a displaying screen or the like, or a position the same as a position of eyes in a preceding photographic image or the like). For the image processing, image processing is performed such that the photographic image will be at a predetermined position, for example, by carrying out image processing including at least one of magnification, reduction, translation and rotation, as in the invention in the twenty-sixth aspect.

Then, the display step displays the photographic image that has been processed in the image processing step. That is, the photographic image which has been subjected to image processing in the image processing step such that the position of the eyes of a person included in the photographic image is at the predetermined position is displayed. Thus, when photographic images that show a person are being browsed, the positions of the eyes of the subject are considered, and positions of the eyes in the photographic images displayed in the display step are at the predetermined positions. Therefore, during browsing of the photographic images, browsing with a line of sight being kept constant is possible.

According to the present invention as described hereabove, there is an excellent effect in that positions of eyes are displayed at predetermined positions and thus, during browsing of photographic images, browsing with a line of sight being kept constant is possible.

What is claimed is:

1. An image display device comprising:
   an extraction component that extracts from photographic images a photographic image in which a face has been photographed;
   a calculation component that calculates a position of an eye in the photographic image extracted by the extraction component;
   an image processing component that performs image processing on the photographic image such that the position of the eye calculated by the calculation component will be arranged at a predetermined position in the photographic image displayed by a display component; and
   a display component that displays the photographic image which has been processed by the image processing component.

2. The image display device of claim 1, further comprising a selection component that selects a photographic image to be displayed at the display component.

3. The image display device of claim 1, wherein the display component displays photographic images in a predetermined sequence.

4. The image display device of claim 1, wherein
   the extraction component extracts a photographic image in which a face including left and right eyes has been photographed, and
   the calculation component calculates positions of the left and right eyes.

5. The image display device of claim 1, wherein the calculation component calculates a central position of a rectangular region including the eye.

6. The image display device of claim 1, wherein
   the calculation component includes a pupil detection component that detects a pupil, and
   the calculation component calculates a position of the pupil detected by the pupil detection component to serve as the position of the eye.

7. The image display device of claim 6, wherein if the pupil detection component cannot detect a pupil, the calculation component calculates a central position of a rectangular region including the eye to serve as the position of the eye.

8. The image display device of claim 1, wherein
   from a photographic image group including a plurality of photographic images, the extraction component extracts photographic images in which a face has been photographed, to serve as a face photographic image group,
   the calculation component calculates a position of an eye in each photographic image of the face photographic image group, the image processing component performs image processing on each photographic image of the face photographic image group, and the display component displays each photographic image of the face photographic image group.

9. The image display device of claim 1, wherein the display component displays the photographic image which has been processed by the image processing component when a pre-specified display mode is set.

10. The image display device of claim 1, wherein the extraction component further extracts a photographic image that includes a particular person.

11. The image display device of claim 1, wherein the extraction component further extracts a photographic image that includes a face with a particular angle.

12. The image display device of claim 1, wherein the image processing component estimates a rotation of the face about a vertical direction rotation axis in the photographic image, estimates, from an estimated distance of a pair of eyes, a distance of the pair of eyes if the face were facing directly forward, and performs image processing such that the distance of the pair of eyes will be a pre-specified target distance.

13. The image display device of claim 1, wherein the image processing component performs image processing including at least one of magnification, reduction, translation and rotation of the photographic image.

14. An image display method comprising:
(a) extracting from photographic images a photographic image in which a face has been photographed;
(b) calculating a position of an eye in the photographic image extracted in (a);
(c) performing image processing on the photographic image such that the position of the eye calculated in (b) will be arranged at a predetermined position in the photographic image displayed by a display component; and
(d) displaying the photographic image which has been processed in (c).

15. The image display method of claim 14, further comprising
(e) selecting a photographic image to be displayed in (d).

16. The image display method of claim 14, wherein (d) includes displaying photographic images in a predetermined sequence.

17. The image display method of claim 14, wherein
(a) includes extracting a photographic image in which a face including left and right eyes has been photographed, and
(b) includes calculating positions of the left and right eyes.

18. The image display method of claim 14, wherein (b) includes calculating a central position of a rectangular region including the eye.

19. The image display method of claim 14, wherein (b) includes detecting a pupil, and calculating a position of the pupil to serve as the position of the eye.

20. The image display method of claim 19, wherein (b) includes, if a pupil cannot be detected, calculating a central position of a rectangular region including the eye to serve as the position of the eye.

21. The image display method of claim 14, wherein
(a) includes extracting, from a photographic image group including a plurality of photographic images, photographic images in which a face has been photographed, to serve as a face photographic image group,
(b) includes calculating the position of an eye in each photographic image of the face photographic image group,
(c) includes performing image processing on each photographic image of the face photographic image group, and
(d) includes displaying each photographic image of the face photographic image group which has been processed in (c).

22. The image display method of claim 14, wherein (d) includes displaying the photographic image which has been processed in (c) when a pre-specified display mode is set.

23. The image display method of claim 14, wherein (a) includes further extracting a photographic image that includes a particular person.

24. The image display method of claim 14, wherein (a) includes further extracting a photographic image that includes a face with a particular angle.

25. The image display method of claim 14, wherein (c) includes estimating a rotation of the face about a vertical direction rotation axis in the photographic image, estimating, from an estimated distance of a pair of eyes, a distance of the pair of eyes if the face were facing directly forward, and performing image processing such that the distance of the pair of eyes will be a pre-specified target distance.

26. The image display method of claim 14, wherein (c) includes performing image processing including at least one of magnification, reduction, translation and rotation of the photographic image.

27. A non-transitory storage medium readable by a computer, the storage medium storing a program of instructions executable by the computer to perform a function for image display, the function comprising the steps of:
(a) extracting from photographic images a photographic image in which a face has been photographed;
(b) calculating a position of an eye in the photographic image extracted in (a);
(c) performing image processing on the photographic image such that the position of the eye calculated in (b) will be arranged at a predetermined position in the photographic image displayed by a display component; and
(d) displaying the photographic image which has been processed in (c).

* * * * *